US012767555B2

(12) United States Patent
Yoo et al.

(10) Patent No.: US 12,767,555 B2
(45) Date of Patent: Oct. 20, 2026

(54) IRREVERSIBLE ADDITIVE, POSITIVE ELECTRODE INCLUDING THE IRREVERSIBLE ADDITIVE, AND LITHIUM SECONDARY BATTERY INCLUDING THE POSITIVE ELECTRODE

(71) Applicant: LG Energy Solution, Ltd., Seoul (KR)

(72) Inventors: Tae Gu Yoo, Daejeon (KR); Byung Chun Park, Daejeon (KR); Bo Ram Lee, Daejeon (KR); Tae Gon Kim, Daejeon (KR); Min Kwak, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 900 days.

(21) Appl. No.: 17/784,319

(22) PCT Filed: Feb. 26, 2021

(86) PCT No.: PCT/KR2021/002454
§ 371 (c)(1),
(2) Date: Jun. 10, 2022

(87) PCT Pub. No.: WO2021/172933
PCT Pub. Date: Sep. 2, 2021

(65) Prior Publication Data
US 2023/0059519 A1 Feb. 23, 2023

(30) Foreign Application Priority Data
Feb. 26, 2020 (KR) ........................ 10-2020-0023935

(51) Int. Cl.
*C01G 53/42* (2025.01)
*H01M 10/052* (2010.01)
*H01M 50/46* (2021.01)

(52) U.S. Cl.
CPC .......... *C01G 53/42* (2013.01); *H01M 10/052* (2013.01); *H01M 50/46* (2021.01); *C01P 2006/40* (2013.01)

(58) Field of Classification Search
CPC ..... C01G 53/42; C01G 53/40; H01M 10/052; H01M 50/46; H01M 10/058; H01M 10/446; H01M 2004/028; H01M 4/62; H01M 4/0404; H01M 4/139; C01P 2006/40; C01P 2002/54; C01P 2002/72; Y02E 60/10
See application file for complete search history.

(56) References Cited

U.S. PATENT DOCUMENTS

| | | | | |
|---|---|---|---|---|
| 5,700,598 | A | 12/1997 | Denis et al. | |
| 2005/0026041 | A1 | 2/2005 | Jouanneau et al. | |
| 2005/0118496 | A1 * | 6/2005 | Chang .................. | H01M 4/366 429/231.1 |
| 2014/0199587 | A1 | 7/2014 | Han et al. | |
| 2015/0010823 | A1 | 1/2015 | Yu et al. | |
| 2016/0190575 | A1 | 6/2016 | Yu et al. | |
| 2016/0351904 | A1 | 12/2016 | Goodenough et al. | |
| 2020/0075957 | A1 | 3/2020 | Jeon et al. | |
| 2020/0176754 | A1 | 6/2020 | Lho et al. | |

FOREIGN PATENT DOCUMENTS

| | | | |
|---|---|---|---|
| JP | H05198301 | A | 8/1993 |
| JP | H06333569 | A | 12/1994 |
| JP | H07320741 | A | 12/1995 |
| JP | 2000503622 | A | 3/2000 |
| KR | 20040060944 | A | 7/2004 |
| KR | 20090011219 | A | 2/2009 |
| KR | 20140092739 | A | 7/2014 |
| KR | 20150004645 | A | 1/2015 |
| KR | 20160064878 | A | 6/2016 |
| KR | 20160081111 | A | 7/2016 |
| KR | 20180014040 | A | 2/2018 |
| KR | 20180074071 | A * | 7/2018 |
| KR | 20190056997 | A | 5/2019 |
| KR | 20190059242 | A | 5/2019 |

OTHER PUBLICATIONS

Machine translation of description and claims JPH06333569A.*
Machine translation of KR20180074071A.*
Machine translation of JPH05198301A.*
Kim et al.; Thermal Decomposition Study on Li2O2 for Li2NiO2 Synthesis as a Sacrificing Positive Additive of Lithium-Ion Batteries; Molecules 2019, 24, 4624. (Year: 2019).*
Search Report dated Aug. 3, 2023 from the Office Action for Chinese Application No. 202180007115.1 issued Aug. 5, 2023, 2 pages. [See p. 1, categorizing the cited references].
Park, Hosang et al: "Li2NIO2 as a sacrificing positive additive for lithium-ion batteries", Electrochimica Acta, Jul. 2, 2013 (Jul. 2, 2013), pp. 591-595, vol. 108, Elsevier, Amsterdam, NL. xp028757637, ISSN: 0013-4686, DOI: 10.1016/J.ELECTACTA.2016.06.117.
Extended European Search Report including Written Opinion for Application No. 21760388.5 dated Apr. 6, 2023, pp. 1-5.
International Search Report for Application No. PCT/KR2021/002454 mailed Jun. 15, 2021, pp. 1-3.

(Continued)

*Primary Examiner* — Matthew T Martin
*Assistant Examiner* — Felicity B Alban
(74) *Attorney, Agent, or Firm* — Lerner David LLP

(57) ABSTRACT

Provided is a method of preparing an irreversible positive electrode additive for a secondary battery, which includes mixing $Li_2O$, NiO, and $NH_4VO_3$ and performing thermal treatment to prepare a lithium nickel composite oxide represented by Chemical Formula 1 below, wherein the $NH_4VO_3$ is mixed in an amount of 1.5 to 6.5 parts by weight with respect to a total of 100 parts by weight of the $Li_2O$, NiO, and $NH_4VO_3$.

$Li_{2+a}Ni_{1-b-c}M^1_bV_cO_{2-d}A_d$ [Chemical Formula 1]

In Chemical Formula 1,
$M^1$ is at least one selected from the group consisting of Cu, Mg, Pt, Al, Co, P, W, Zr, Nb, and B, A is at least one selected from the group consisting of F, S, Cl, and Br, and $0 \le a \le 0.2$, $0 \le b \le 0.5$, $0.01 \le c \le 0.065$, and $0 \le d \le 0.2$ are satisfied.

4 Claims, No Drawings

(56) References Cited

OTHER PUBLICATIONS

Zhang, C. et al., "Revealing the role of NH4VO3 treatment on Ni-rich cathode materials with improved electrochemical performance for rechargeable lithium-ion batteries," Nanoscale, Apr. 2018, pp. 1-37, vol. 10.

* cited by examiner

IRREVERSIBLE ADDITIVE, POSITIVE ELECTRODE INCLUDING THE IRREVERSIBLE ADDITIVE, AND LITHIUM SECONDARY BATTERY INCLUDING THE POSITIVE ELECTRODE

CROSS-REFERENCE TO RELATED APPLICATION

The present application is a national phase entry under 35 U.S.C. § 371 of International Application No. PCT/KR2021/002454, filed Feb. 26, 2021, which claims priority from Korean Patent Application No. 10-2020-0023935 filed, Feb. 26, 2020, the disclosures of which are incorporated herein by reference in its entirety.

TECHNICAL FIELD

The present disclosure relates to a method of preparing an irreversible positive electrode additive for a secondary battery, an irreversible positive electrode additive prepared thereby, a positive electrode for a secondary battery, including the irreversible positive electrode additive, and a lithium secondary battery including the positive electrode.

BACKGROUND ART

As technology for mobile devices is developed and the demand for mobile devices increases, the demand for secondary batteries as a power source is rapidly increasing, and among secondary batteries, lithium secondary batteries having a high energy density, a high operating potential, a long cycle lifespan, and a low self-discharge rate have been commercialized and widely used.

Lithium secondary batteries generally consist of a positive electrode including a positive electrode active material, a negative electrode including a negative electrode active material, a separator, and an electrolyte and are secondary batteries that are charged and discharged by intercalation and deintercalation of lithium ions. Due to having advantageous features such as a high energy density, a large electromotive force, and the ability to exhibit high capacity, lithium secondary batteries have been applied to various fields.

To realize high capacity lithium secondary batteries, various methods have been studied. Specifically, an attempt to realize high capacity lithium secondary batteries by using one type or at least two types of materials selected from $LiCoO_2$ (LCO), lithium manganese composite metal oxides ($LiMnO_2$, $LiMn_2O_4$, etc.), nickel cobalt manganese-based lithium composite metal oxides (LNCMO), in which a part of Ni is substituted with Mn and Co, and the like as a positive electrode active material included in the positive electrode for lithium secondary batteries has been made. However, to practically increase the capacity of lithium secondary batteries, not only the capacity of the positive electrode but also the capacity of the negative electrode needs to be enhanced. For this purpose, an attempt to use a silicon-based negative electrode active material with high capacity in the negative electrode has also been made. However, in the case of batteries using the silicon-based negative electrode active materials, an electrolyte is decomposed to cause the formation of a solid electrolyte interphase (SEI) layer on the surface of the negative electrode active material during initial charging, and accordingly, irreversible capacity is generated. Due to the generation of irreversible capacity, energy density is decreased, and thus the theoretical capacity of secondary batteries is not sufficiently used.

Therefore, to improve irreversible capacity, $Li_2NiO_2$, $Li_2CuO_4$, $Li_6CoO_4$, or the like was added as an irreversible positive electrode additive. In this case, $Li_2NiO_2$ is synthesized by a solid-state method of $Li_2O$ and NiO, and due to a low synthesis rate, $Li_2O$ and NiO are basically left as unreacted materials. The unreacted materials, $Li_2O$ and NiO, are difficult to exhibit capacity, and particularly, $Li_2O$ may be converted into LiOH and $Li_2CO_3$, which leads to the occurrence of gelation during the manufacture of a positive electrode and the generation of gas during charging/discharging and high-temperature storage of the lithium secondary battery.

DISCLOSURE

Technical Problem

The present disclosure is generally directed to a method of preparing an irreversible positive electrode additive, which is capable of enhancing a synthesis rate of a lithium nickel composite oxide (e.g., $Li_2NiO_2$), which is an irreversible positive electrode additive, and reducing the content of unreacted materials $Li_2O$ and NiO, thereby suppressing gelation during the manufacture of a positive electrode and reducing gas generation during charging/discharging and high-temperature storage of a lithium secondary battery, an irreversible positive electrode additive prepared thereby, and a positive electrode and a lithium secondary battery which include the irreversible positive electrode additive.

Technical Solution

One aspect of the present disclosure provides a method of preparing an irreversible positive electrode additive for a secondary battery, which includes mixing $Li_2O$, NiO, and $NH_4VO_3$ and performing thermal treatment to prepare a lithium nickel composite oxide represented by Chemical Formula 1 below, wherein the $NH_4VO_3$ is mixed in an amount of 1.5 to 6.5 parts by weight with respect to a total of 100 parts by weight of the $Li_2O$, NiO, and $NH_4VO_3$.

$$Li_{2+a}Ni_{1-b-c}M^1_bV_cO_{2-d}A_d \quad \text{[Chemical Formula 1]}$$

In Chemical Formula 1, $M^1$ is at least one selected from the group consisting of Cu, Mg, Pt, Al, Co, P, W, Zr, Nb, and B, A is at least one selected from the group consisting of F, S, Cl, and Br, and $0 \le a \le 0.2$, $0 \le b \le 0.5$, $0.01 \le c \le 0.065$, and $0 \le d \le 0.2$ are satisfied.

Another aspect of the present disclosure provides a method of manufacturing a positive electrode for a secondary battery, which includes: mixing an irreversible positive electrode additive for a secondary battery prepared by the above-described method, a conductive material, and a binder to prepare a positive electrode slurry; and applying the positive electrode slurry onto a positive electrode current collector to manufacture a positive electrode.

Still another aspect of the present disclosure provides an irreversible positive electrode additive for a secondary battery, which includes a lithium nickel composite oxide represented by Chemical Formula 1 below, $Li_2O$, and NiO, wherein the lithium nickel composite oxide is included in an amount of 90 to 95 wt % with respect to the total weight of the lithium nickel composite oxide, $Li_2O$, and NiO.

$$Li_{2+a}Ni_{1-b-c}M^1_bV_cO_{2-d}A_d \quad \text{[Chemical Formula 1]}$$

In Chemical Formula 1, $M^1$ is at least one selected from the group consisting of Cu, Mg, Pt, Al, Co, P, W, Zr, Nb, and B, A is at least one selected from the group consisting of F, S, Cl, and Br, and $0a\leq 0.2$, $0\leq b\leq 0.5$, $0.01\leq c\leq 0.065$, and $0\leq d\leq 0.2$ are satisfied.

Yet another aspect of the present disclosure provides a positive electrode for a secondary battery, which includes the above-described irreversible positive electrode additive for a secondary battery, a conductive material, and a binder.

Yet another aspect of the present disclosure provides a lithium secondary battery which includes: the above-described positive electrode for a secondary battery; a negative electrode disposed to face the positive electrode; and a separator interposed between the positive electrode and the negative electrode.

Advantageous Effects

According to the present disclosure, it is possible to suppress gelation during the manufacture of a positive electrode and reduce gas generation during charging/discharging and high-temperature storage of a lithium secondary battery by enhancing a synthesis rate of a lithium nickel composite oxide (e.g., $Li_2NiO_2$), which is an irreversible positive electrode additive, and reducing the content of unreacted materials $Li_2O$ and NiO.

EXEMPLARY EMBODIMENTS OF THE PRESENT DISCLOSURE

Hereinafter, various embodiments and examples of the present disclosure will be described in more detail to facilitate understanding of the present disclosure, though these particular described embodiments and examples are for illustration only and the present disclosure should not be considered to be limited to such embodiments and examples herein. Terms and words used in this specification and claims should not be interpreted as being limited to commonly used meanings or meanings in dictionaries, and, based on the principle that the inventors can appropriately define concepts of terms in order to describe their present disclosure as desired, the terms and words should be interpreted with meanings and concepts which are consistent with the technological spirit of the present disclosure.

≤Irreversible Positive Electrode Additive>

The present disclosure provides a method of preparing an irreversible positive electrode additive for a secondary battery, which includes mixing $Li_2O$, NiO, and $NH_4VO_3$ and performing thermal treatment to prepare a lithium nickel composite oxide represented by Chemical Formula 1 below, wherein the $NH_4VO_3$ is mixed in an amount of 1.5 to 6.5 parts by weight with respect to a total of 100 parts by weight of the $Li_2O$, NiO, and $NH_4VO_3$.

$$Li_{2+a}Ni_{1-b-c}M^1_bV_cO_{2-d}A_d \quad \text{[Chemical Formula 1]}$$

In Chemical Formula 1, $M^1$ is at least one selected from the group consisting of Cu, Mg, Pt, Al, Co, P, W, Zr, Nb, and B, A is at least one selected from the group consisting of F, S, Cl, and Br, and $0a\leq 0.2$, $0\leq b\leq 0.5$, $0.01\leq c\leq 0.065$, and $0\leq d\leq 0.2$ are satisfied.

According to the present disclosure, since a specific amount of $NH_4VO_3$ may be added in addition to $Li_2O$ and NiO in the preparation of the lithium nickel composite oxide of Chemical Formula 1 as an irreversible positive electrode additive so as to induce V doping, a synthesis rate of the lithium nickel composite oxide of Chemical Formula 1 is substantially enhanced, and the content of unreacted materials $Li_2O$ and NiO is reduced, resulting in a reduction of gas generation. Specifically, when a specifically small amount of $NH_4VO_3$ is added as a V doping source, ammonium of $NH_4VO_3$ causes the formation of defects in NiO in a temperature range of 200 to 300° C., and thus the contact area between $Li_2O$ and the dopant V may increase, thereby enhancing a synthesis rate of the lithium nickel composite oxide of Chemical Formula 1 and simultaneously increasing the doping effect. Also, vanadium (V) of $NH_4VO_3$ has effects of reducing impurities, reducing unreacted materials, and reducing a gas generation amount by decreasing the contact area with an electrolyte solution and enhancing a synthesis rate.

In the present disclosure, an amount of added $NH_4VO_3$ can be 1.5 to 6.5 parts by weight with respect to a total of 100 parts by weight of the $Li_2O$, NiO, and $NH_4VO_3$. The amount of added $NH_4VO_3$ may specifically be 2 to 5.5 parts by weight, more specifically 3 to 5.5 parts by weight, and even more specifically 4 to 5.5 parts by weight, with respect to a total of 100 parts by weight of the $Li_2O$, NiO, and $NH_4VO_3$. When $NH_4VO_3$ is mixed within the above-described range with respect to a total of 100 parts by weight of the $Li_2O$, NiO, and $NH_4VO_3$, a synthesis rate of the lithium nickel composite oxide of Chemical Formula 1 can be substantially enhanced, and a gas generation amount can be reduced. Meanwhile, when the amount of added $NH_4VO_3$ is less than 1.5 parts by weight with respect to a total of 100 parts by weight of the $Li_2O$, NiO, and $NH_4VO_3$, a synthesis rate of the lithium nickel composite oxide may be insignificantly enhanced, and when the amount of added $NH_4VO_3$ exceeds 6.5 parts by weight with respect to a total of 100 parts by weight of the $Li_2O$, NiO, and $NH_4VO_3$, a reduction reaction of NiO and the like becomes dominant over a formation reaction of a lithium nickel composite oxide due to the presence of excessive ammonium, and thus a synthesis rate of the lithium nickel composite oxide may be decreased.

In the lithium nickel composite oxide of Chemical Formula 1 prepared as described above, a range of c, that is, a molar proportion of vanadium (V), may satisfy $0.01\leq c\leq 0.065$, specifically $0.015\leq c\leq 0.055$, more specifically $0.025\leq c\leq 0.055$, and even more specifically $0.035\leq c\leq 0.055$. When vanadium (V) is contained within the above-described range, a synthesis rate of the lithium nickel composite oxide of Chemical Formula 1 can be enhanced, and a gas reduction effect can occur.

The $Li_2O$ and NiO may be mixed in a $Li_2O$/NiO molar ratio of 0.9 to 1.1, specifically 0.92 to 1.05, and more specifically 0.95 to 1.03. When $Li_2O$ and NiO are mixed in the above-described molar ratio range, an appropriate amount of Li is used to produce a lithium nickel composite oxide, and thus an unreacted material $Li_2O$ can be reduced.

The thermal treatment may be performed at 600 to 800° C., specifically 650 to 750° C., and more specifically 670 to 720° C. When the thermal treatment is performed at the above-described temperature, crystallinity can be maximally obtained while maximizing a synthesis rate of the lithium nickel composite oxide. The thermal treatment may be specifically performed under an inert (e.g., $N_2$, Ar) atmosphere for 10 to 20 hours.

The lithium nickel composite oxide prepared as described above may be represented by Chemical Formula 1, and the oxide represented by Chemical Formula 1 may contain lithium and nickel in a molar ratio of 1.5 to 2:1, specifically in a molar ratio of 1.8 to 2:1, and more specifically in a molar ratio of 2:1. Specifically, the lithium nickel composite oxide represented by Chemical Formula 1 may be $Li_2Ni_{1-c}V_cO_2$ (c' ranges from 0.01 to 0.065, specifically, from 0.015 to 0.055, more specifically, from 0.025 to 0.055, and even more specifically, from 0.035 to 0.055). When the molar ratio of lithium and nickel satisfies the above-described range, an orthorhombic crystal structure can be stably formed, and a gas generation amount can be reduced by doping with vanadium (V) in the above-described content ratio.

According to the present disclosure, since $NH_4VO_3$ is added together with $Li_2O$ and NiO in the preparation of the lithium nickel composite oxide of Chemical Formula 1 as an irreversible positive electrode additive, a synthesis rate of the lithium nickel composite oxide can be enhanced, and the content of unreacted materials $Li_2O$ and NiO can be reduced. As a result, the conversion of $Li_2O$ into LiOH and $Li_2CO_3$ is decreased, and thus reactivity with an electrolyte solution can be decreased, and gas generation can be reduced.

In addition, the present disclosure provides an irreversible positive electrode additive prepared by the above-described method.

The irreversible positive electrode additive includes a lithium nickel composite oxide represented by Chemical Formula 1 below, $Li_2O$, and NiO and includes the lithium nickel composite oxide in an amount of 90 to 95 wt % with respect to the total weight of the lithium nickel composite oxide, $Li_2O$, and NiO.

$$Li_{2+a}Ni_{1-b-c}M^1_bV_cO_{2-d}A_d \quad \text{[Chemical Formula 1]}$$

In Chemical Formula 1, $M^1$ is at least one selected from the group consisting of Cu, Mg, Pt, Al, Co, P, W, Zr, Nb, and B, A is at least one selected from the group consisting of F, S, Cl, and Br, and 0a≤0.2, 0≤b≤0.5, 0.01≤c≤0.065, and 0≤d≤0.2 are satisfied.

In the lithium nickel composite oxide of Chemical Formula 1, a range of c, that is, a molar proportion of vanadium (V) may specifically satisfy 0.015≤c≤0.055, more specifically 0.025≤c≤0.055, and even more specifically 0.035≤c≤0.055. When vanadium (V) is contained within the above-described range, a synthesis rate of the lithium nickel composite oxide can be enhanced, and a gas reduction effect can be produced.

The irreversible positive electrode additive may include the lithium nickel composite oxide in an amount of 90 to 95 wt %, specifically 91 to 95 wt %, and more specifically 92 to 95 wt %, with respect to the total weight of the lithium nickel composite oxide, $Li_2O$, and NiO. This can be considered to be a result of enhancing a synthesis rate by synthesis with the addition of $NH_4VO_3$. Meanwhile, the irreversible positive electrode additive may include the unreacted material $Li_2O$ in an amount of 5 wt % or less, specifically 4 wt % or less, and more specifically 3 wt % or less, with respect to the total weight of the lithium nickel composite oxide, $Li_2O$, and NiO. In addition, the irreversible positive electrode additive may include the unreacted material NiO in an amount of 9 wt % or less, specifically 8 wt % or less, and more specifically 7 wt % or less, with respect to the total weight of the lithium nickel composite oxide, $Li_2O$, and NiO. It can be considered that the content of the unreacted materials $Li_2O$ and NiO may be reduced as a result of enhancing a synthesis rate by synthesis with the addition of $NH_4VO_3$.

≤Positive Electrode and Lithium Secondary Battery>

In addition, the present disclosure provides a positive electrode for a secondary battery and a lithium secondary battery, either of which can include the irreversible positive electrode additive prepared as described above.

Specifically, for example, the positive electrode for a secondary battery includes a positive electrode current collector and a positive electrode active material layer formed on the positive electrode current collector and including the positive electrode active material.

In the positive electrode, the positive electrode current collector is not particularly limited as long as it does not cause a chemical change in the battery and has conductivity. For example, stainless steel, aluminum, nickel, titanium, fired carbon, or aluminum or stainless steel whose surface has been treated with carbon, nickel, titanium, silver, or the like may be used as the positive electrode current collector. In addition, the positive electrode current collector may typically have a thickness of 3 μm to 500 μm and have fine irregularities formed on the surface thereof to increase the adhesion of the positive electrode active material. Additionally, the positive electrode current collector may be used in any of various forms such as a film, a sheet, a foil, a net, a porous material, a foam, a non-woven fabric, and the like.

In addition, the positive electrode active material layer may include a conductive material and a binder in addition to the above-described irreversible positive electrode additive.

In this case, the conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be typically included in an amount of 1 to 30 wt % with respect to the total weight of the positive electrode active material layer.

The binder serves to enhance cohesion between positive electrode active material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluoro-rubber, and various copolymers thereof, which may be used alone or in combination of two or more thereof. The binder may be included in an amount of 1 to 30 wt % with respect to the total weight of the positive electrode active material layer.

In addition, the positive electrode active material layer may further include a positive electrode active material other than the irreversible positive electrode additive. As a specific example, lithium transition metal oxides typically used as a positive electrode active material may be used without limitation, and specifically, lithium transition metal oxides containing one or more transition metal cations selected from the group consisting of cobalt (Co), nickel (Ni), and manganese (Mn) may be used. For example, the positive electrode active material includes: a layered compound such as a lithium cobalt oxide ($LiCoO_2$), a lithium nickel oxide ($LiNiO_2$), or the like; a lithium manganese oxide such as the chemical formula $Li_{1+n}Mn_{2-n}O_4$ (where n=0 to 0.33), $LiMnO_3$, $LiMn_2O_3$, $LiMnO_2$, or the like; a Ni-site-type lithium nickel oxide represented by the chemical formula $LiNi_{1-m}M^a{}_mO_2$ (where $M^a$=Co, Mn, Al, Cu, Fe, Mg, B, or Ga, m=0.01 to 0.3); a lithium manganese composite oxide represented by the chemical formula $LiMn_{2-z}M^b{}_zO_2$ (where $M^b$=Co, Ni, Fe, Cr, Zn, or Ta, z=0.01 to 0.1) or $Li_2Mn_3M^cO_8$ (where M°=Fe, Co, Ni, Cu, or Zn); a lithium manganese composite oxide represented by $LiNi_rMn_{2-r}O_4$ (where r=0.01 to 1) and having a spinel structure, a lithium iron phosphate compound ($LiFePO_4$), and the like, but the present disclosure is not limited thereto. Alternatively, as the positive electrode active material, a lithium composite transition metal oxide represented by Chemical Formula 2 below may be included.

$$Li_{x1}Ni_{1-y1-z1-s1}Co_{y1}Mn_{z1}Q_{s1}O_{2+\delta} \quad \text{[Chemical Formula 2]}$$

In Chemical Formula 2, Q is one or more elements selected from the group consisting of Al, Zr, Ti, Mg, Ta, Nb, Mo, and Cr, and $0.9 \leq x1 \leq 1.5$, $0 \leq y1 \leq 0.5$, $0 \leq z1 \leq 0.5$, $0 \leq s1 \leq 0.1$, and $-0.1 \leq \delta \leq 1.0$ are satisfied.

The positive electrode of this example may be manufactured by a typical method of manufacturing a positive electrode, except that the above-described irreversible positive electrode additive is used. Specifically, the positive electrode may be manufactured by mixing the above-described irreversible positive electrode additive, a binder, a conductive material, and optionally, an additional positive electrode active material, to prepare a positive electrode slurry, and applying the positive electrode slurry onto a positive electrode current collector, followed by drying and roll pressing. In this case, the types and contents of the positive electrode active material, the binder, and the conductive material have been described above.

As a solvent, a solvent generally used in the art may be used, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount sufficient to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the positive electrode slurry on a separate support and removing it from the support.

Still another aspect of the present disclosure provides an electrochemical device including the above-described positive electrode. The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. The positive electrode has been described above. In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer disposed on the negative electrode current collector.

The negative electrode current collector is not particularly limited as long as it does not cause a chemical change in the battery and has high conductivity. For example, copper, stainless steel, aluminum, nickel, titanium, fired carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material. For example, the negative electrode active material layer may be formed by applying a composition for forming a negative electrode, which includes a negative electrode active material and, optionally, a binder and a conductive material, onto a negative electrode current collector and then drying the same, or by laminating, on a negative electrode current collector, a film obtained by casting the composition for forming a negative electrode on a separate support and removing it from the support.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta (0<\beta<2)$, $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature fired carbon such as petroleum or coal tar pitch-derived cokes, and the like. To enhance capacity, specifically, a Si-based negative electrode active material may be used as the negative electrode active material.

In addition, the binder and the conductive material are the same as those described for the positive electrode.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present disclosure, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of the lithium secondary battery, may be used, but the present disclosure is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that is capable of providing lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexamethylphosphoric triamide, a nitrobenzene derivative, sulfur, a quinone imine dye, N-substituted oxazolidinone, N,N-substituted imidazolidine, an ethylene glycol dialkyl ether, an ammonium salt, pyrrole, 2-methoxyethanol, aluminum trichloride, and the like for the purpose of enhancing the lifetime characteristics of the battery, suppressing a decrease in battery capacity, enhancing the discharge capacity of the battery, or the like. In this case, the additive may be included in an amount of 0.1 to 5 wt % with respect to the total weight of the electrolyte.

Since the lithium secondary battery including the positive electrode active material according to the present disclosure stably exhibits excellent discharge capacity, excellent output characteristics, and an excellent capacity retention rate, it is useful in the fields of portable devices such as mobile phones, notebook computers, digital cameras, and the like and electric vehicles such as hybrid electric vehicles (HEVs) and the like.

Accordingly, yet another aspect of the present disclosure provides a battery module including the lithium secondary battery as a unit cell and a battery pack including the battery module.

The battery module or battery pack may be used as a power source for one or more medium-to-large-sized devices selected from power tools; electric vehicles (EVs), hybrid electric vehicles, and plug-in hybrid electric vehicles (PHEVs); and systems for storing electric power.

Hereinafter, the present disclosure will be described in detail with reference to embodiments so that those skilled in the art can easily carry out the present disclosure. However, the present disclosure may be embodied in several different forms, and therefore, is not limited to embodiments described herein.

Example 1

$Li_2O$ and NiO were mixed so that a Li/Ni molar ratio was 2.0, and $NH_4VO_3$ was mixed therewith in an amount of 2 parts by weight with respect to a total of 100 parts by weight of the $Li_2O$, NiO, and $NH_4VO_3$. Afterward, thermal treatment was performed at 685° C. under a $N_2$ atmosphere for 10 hours to prepare an irreversible positive electrode additive represented by $Li_2Ni_{0.982}V_{0.018}O_2$.

Example 2

An irreversible positive electrode additive represented by $Li_2Ni_{0.972}V_{0.028}O_2$ was prepared in the same manner as in Example 1, except that $NH_4VO_3$ was mixed in an amount of 3 parts by weight with respect to a total of 100 parts by weight of the $Li_2O$, NiO, and $NH_4VO_3$.

Example 3

An irreversible positive electrode additive represented by $Li_2Ni_{0.963}V_{0.037}O_2$ was prepared in the same manner as in Example 1, except that $NH_4VO_3$ was mixed in an amount of 4 parts by weight with respect to a total of 100 parts by weight of the $Li_2O$, NiO, and $NH_4VO_3$.

Example 4

An irreversible positive electrode additive represented by $Li_2Ni_{0.948}V_{0.052}O_2$ was prepared in the same manner as in Example 1, except that $NH_4VO_3$ was mixed in an amount of 5.5 parts by weight with respect to a total of 100 parts by weight of the $Li_2O$, NiO, and $NH_4VO_3$.

Comparative Example 1

An irreversible positive electrode additive represented by $Li_2NiO_2$ was prepared in the same manner as in Example 1, except that $NH_4VO_3$ was not mixed.

Comparative Example 2

An irreversible positive electrode additive was prepared in the same manner as in Example 1, except that VO was mixed in an amount of 3 parts by weight instead of $NH_4VO_3$.

Comparative Example 3

An irreversible positive electrode additive was prepared in the same manner as in Example 1, except that $NH_4Cl$ was mixed in an amount of 3 parts by weight instead of $NH_4VO_3$.

Comparative Example 4

An irreversible positive electrode additive represented by $Li_2Ni_{0.991}V_{0.009}O_2$ was prepared in the same manner as in Example 1, except that $NH_4VO_3$ was mixed in an amount of 1 part by weight with respect to a total of 100 parts by weight of the $Li_2O$, NiO, and $NH_4VO_3$.

Comparative Example 5

An irreversible positive electrode additive represented by $Li_2Ni_{0.933}V_{0.067}O_2$ was prepared in the same manner as in Example 1, except that $NH_4VO_3$ was mixed in an amount of 7 parts by weight with respect to a total of 100 parts by weight of the $Li_2O$, NiO, and $NH_4VO_3$.

Experimental Example 1: XRD Analysis

X-ray diffraction (XRD) data for the irreversible positive electrode additives prepared according to Examples 1 to 4 and Comparative Examples 1 to 5 was obtained and then analyzed, and results thereof are shown in Table 1 below.

An XRD measurement instrument, a sample preparation method, and measurement conditions are follows. XRD data was analyzed by a Rietveld refinement method using the complete structure model of phases present in a sample.

Instrument: XRD-12-D8 Endeavor 2 equipped with a Lynxeye XE-T detector

Sample preparation method: A sample was prepared by putting powder into the groove in the center of a general powder holder and making the surface even, that is, making the powder height equal to the height of the edge of the holder, using a slide glass.

Analysis conditions:

Measurement range (2 theta): 100 to 90°

Step size (2 theta): 0.006°

Measurement time (time/step): 38.4 s

X-ray (Cu): 40 kV and 40 mA

Divergence slit: 0.2°

Goniometer radii: 200.5 mm

TABLE 1

| | Lithium nickel composite oxide (wt %) | $Li_2O$ (wt %) | NiO (wt %) |
|---|---|---|---|
| Example 1 | 91.7 | 2.9 | 5.4 |
| Example 2 | 90.3 | 2.8 | 6.9 |
| Example 3 | 92.4 | 2.4 | 5.2 |
| Example 4 | 91.0 | 0.1 | 8.9 |
| Comparative Example 1 | 88.7 | 4.9 | 6.4 |
| Comparative Example 2 | not synthesized | — | — |
| Comparative Example 3 | 89.2 | 2 | 8.8 |
| Comparative Example 4 | 89.6 | 3 | 7.4 |
| Comparative Example 5 | 86.5 | 7 | 6.5 |

Referring to Table 1, Examples 1 to 4 exhibited increased synthesis rates of a lithium nickel composite oxide and reduced amounts of unreacted materials $Li_2O$ and NiO as compared to Comparative Examples 1 to 5. For reference, in the case of Comparative Example 5, a reduction reaction of NiO and the like became dominant over a formation reaction of a lithium nickel composite oxide due to the presence of excessive ammonium in the preparation of an irreversible positive electrode additive, and thus a synthesis rate of a lithium nickel composite oxide was degraded.

Experimental Example 2: Evaluation of Battery Performance

Each of the irreversible positive electrode additives prepared in Examples 1 to 4 and Comparative Examples 1 and 3 to 5, a Super-P conductive material, and a PVDF binder were mixed in a weight ratio of 95:2:3 in a N-methyl pyrrolidone solvent to prepare a positive electrode slurry, and the slurry was then applied onto one surface of an aluminum current collector, dried at 100° C., and then roll-pressed to manufacture a positive electrode.

As a negative electrode, lithium metal was used.

A porous polyethylene separator was interposed between the manufactured positive electrode and the negative electrode to manufacture an electrode assembly. Then, the electrode assembly was placed inside a case, and an electrolyte solution was injected into the case to manufacture a lithium secondary battery. In this case, the electrolyte solution was prepared by dissolving 1.0 M lithium hexafluorophosphate ($LiPF_6$) in an organic solvent containing ethylene carbonate, ethyl methyl carbonate, and diethyl carbonate (EC/EMC/DEC volumetric mixing ratio=3/4/3).

Each manufactured lithium secondary battery cell was charged at 25° C. in the CC/CV mode of 0.1 C up to 4.25 V (final current: 1/20 C) and discharged at a constant current of 0.1 C up to 2.5 V, and the charge and discharge capacities thereof were measured. Then, a change in the volume of the monocell was measured using a volumometer, to which Archimedes volume measurement is applied, to measure a gas generation amount at the $50^{th}$ cycle, and results thereof are shown in the following Table 2.

TABLE 2

| | Charge capacity (mAh/g) | Discharge capacity (mAh/g) | Gas generation amount (@$50^{th}$ cycle) (μl/g) |
|---|---|---|---|
| Example 1 | 395.2 | 147.01 | 7.15 |
| Example 2 | 390.6 | 145.7 | 6.90 |
| Example 3 | 398.3 | 149.4 | 6.83 |
| Example 4 | 397.1 | 149.7 | 4.67 |
| Comparative Example 1 | 376.3 | 145.4 | 8.3 |

TABLE 2-continued

| | Charge capacity (mAh/g) | Discharge capacity (mAh/g) | Gas generation amount (@$50^{th}$ cycle) (μl/g) |
|---|---|---|---|
| Comparative Example 3 | 386.9 | 149.4 | 7.85 |
| Comparative Example 4 | 390.1 | 144.4 | 7.89 |
| Comparative Example 5 | 400.0 | 135.7 | 5.24 |

Referring to Table 2, it can be seen that Examples 1 to 4 exhibited improved capacity characteristics and reduced gas generation amounts at the $50^{th}$ cycle as compared to Comparative Examples 1, 3, and 4. Meanwhile, Comparative Example 5 had a high impurity content due to a low synthesis rate of a lithium nickel composite oxide, and accordingly, the severest gelation occurred in the manufacture of a positive electrode.

Experimental Example 3: Evaluation of High-Temperature Storage

A lithium secondary battery cell was manufactured using each of the irreversible positive electrode additives prepared in Examples 1 to 4 and Comparative Examples 1, 3, and 4 as in Experimental Example 2, except that a negative electrode, which was manufactured by mixing graphite as a negative electrode active material, a carbon black conductive material, and a PVDF binder in a weight ratio of 95:1:4 in a N-methyl pyrrolidone solvent to prepare a composition for forming a negative electrode and applying the composition onto one surface of a copper current collector, was used.

Each manufactured lithium secondary battery monocell was charged in the CC/CV mode of 0.1 C up to 4.2 V (final current: 1/20 C). The charged monocell was stored in a chamber set to 60° C. for 4 weeks, and then a change in the volume of the monocell was measured using a volumometer, to which Archimedes volume measurement is applied, to evaluate a gas generation amount. Results thereof are shown in the following Table 3.

TABLE 3

| | Gas generation amount (μl/g) |
|---|---|
| Example 1 | 4.04 |
| Example 2 | 3.35 |
| Example 3 | 2.67 |
| Example 4 | 2.02 |
| Comparative Example 1 | 4.30 |
| Comparative Example 3 | 5.07 |
| Comparative Example 4 | 4.10 |

Referring to Table 3, it can be seen that Examples 1 to 4 exhibited substantially reduced gas generation amounts after 4-week storage compared to Comparative Examples 1, 3, and 4.

The invention claimed is:

1. An irreversible positive electrode additive for a secondary battery, comprising a lithium nickel composite oxide represented by Chemical Formula 1 below, $Li_2O$, and NiO, wherein the lithium nickel composite oxide is included in an amount of 90 to 95 wt % with respect to a total weight of the lithium nickel composite oxide, $Li_2O$, and NiO:

$$Li_{2+a}Ni_{1-b-c}M^1_bV_cO_{2-d}A_d \quad \text{[Chemical Formula 1]}$$

in Chemical Formula 1, $M^1$ is at least one selected from the group consisting of Cu, Mg, Pt, Al, Co, P, W, Zr, Nb, and B, A is at least one selected from the group consisting of F, S, Cl, and Br, and $0 \le a \le 0.2$, $0 \le b \le 0.5$, $0.01 \le c \le 0.065$, and $0 \le d \le 0.2$ are satisfied.

2. The irreversible positive electrode additive of claim 1, wherein, in Chemical Formula 1, $0.015 \le c \le 0.055$ is satisfied.

3. A positive electrode for a secondary battery, comprising the irreversible positive electrode additive for a secondary battery according to claim 1, a conductive material, and a binder.

4. A lithium secondary battery comprising:

the positive electrode for a secondary battery according to claim 3;

a negative electrode disposed to face the positive electrode; and a separator interposed between the positive electrode and the negative electrode.

* * * * *